Aug. 4, 1925.
H. F. MARANVILLE
1,548,052
MACHINE FOR FORMING ARTICLES OF FABRIC AND RUBBER
Filed Nov. 11, 1919   3 Sheets-Sheet 1
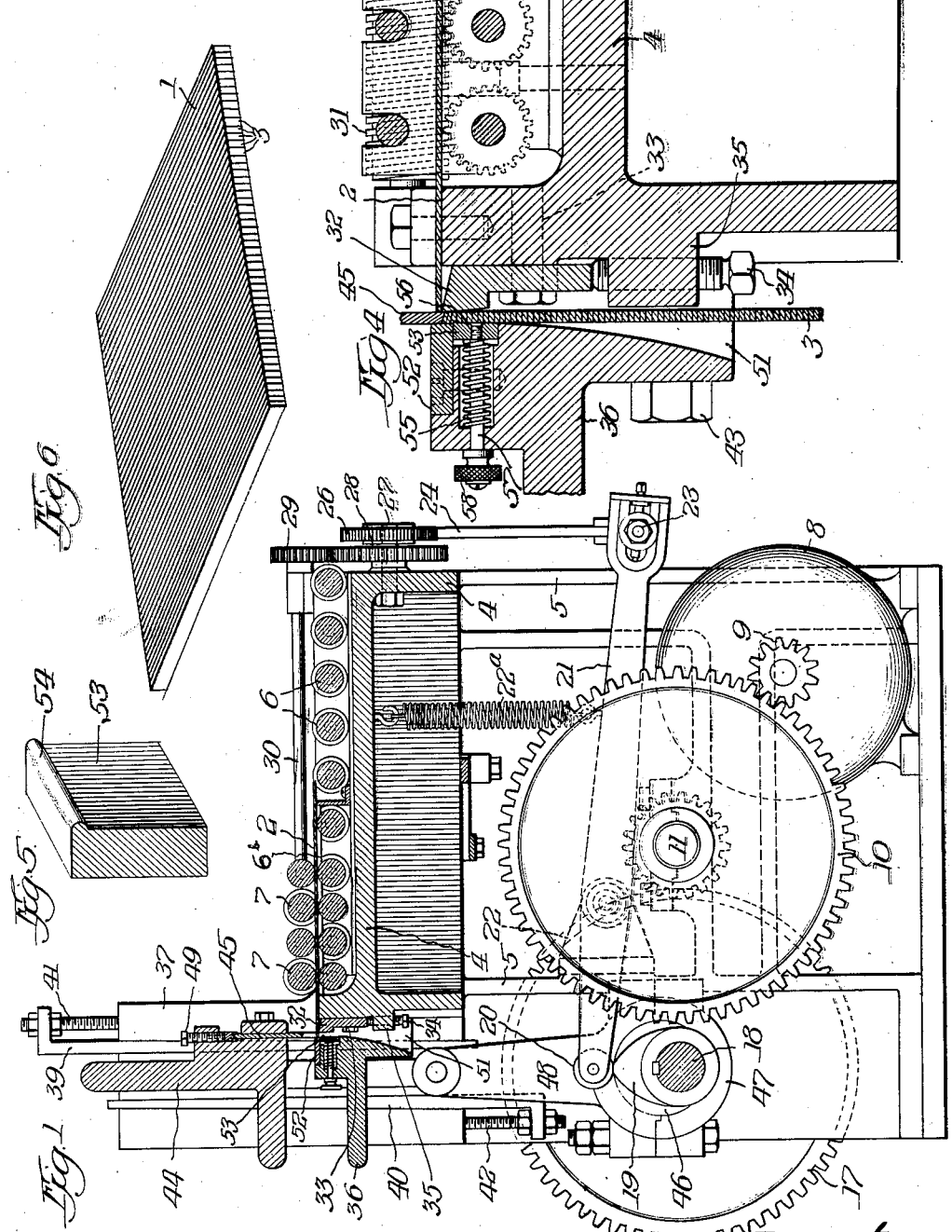
Witness:
Geo. C. Davison
Inventor
Harvey F. Maranville,
By G. L. Ely
Atty Aug. 4, 1925. 1,548,052
H. F. MARANVILLE
MACHINE FOR FORMING ARTICLES OF FABRIC AND RUBBER
Filed Nov. 11, 1919 3 Sheets-Sheet 2
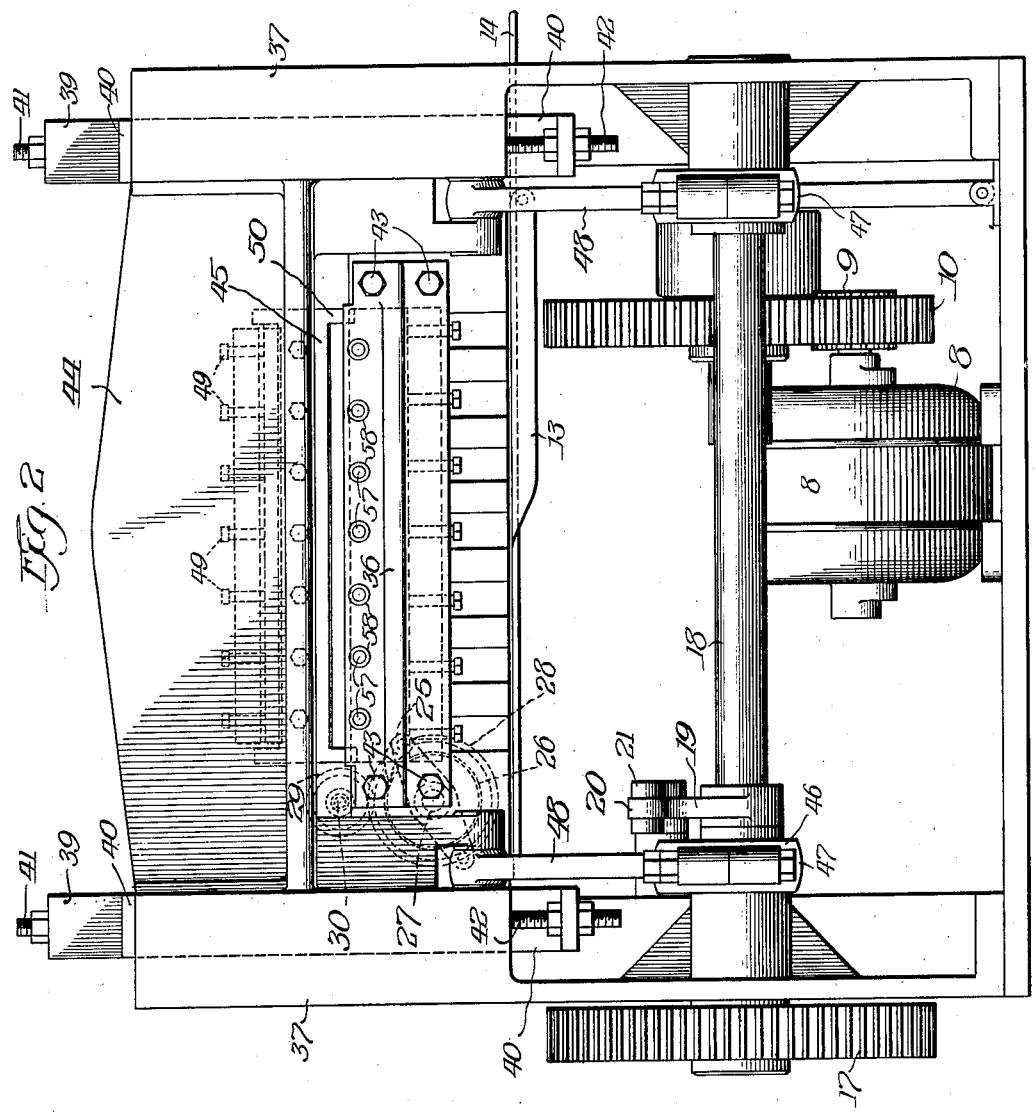

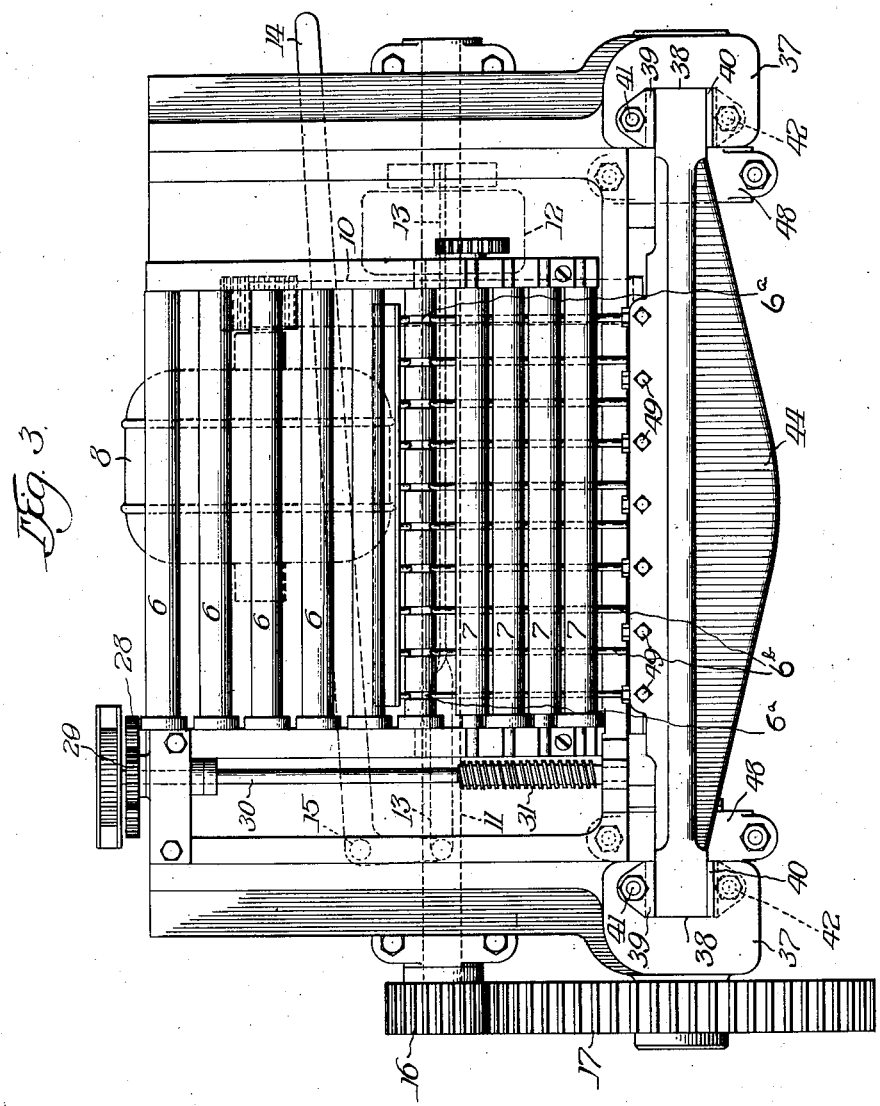

Patented Aug. 4, 1925.

1,548,052

UNITED STATES PATENT OFFICE.

HARVEY F. MARANVILLE, OF AKRON, OHIO, ASSIGNOR TO THE FIRESTONE TIRE AND RUBBER COMPANY, OF AKRON, OHIO, A CORPORATION OF OHIO.

MACHINE FOR FORMING ARTICLES OF FABRIC AND RUBBER.

Application filed November 11, 1919. Serial No. 337,204.

*To all whom it may concern:*

Be it known that I, HARVEY F. MARANVILLE, a citizen of the United States, residing at Akron, in the county of Summit, State of Ohio, have invented certain new and useful Improvements in Machines for Forming Articles of Fabric and Rubber, of which the following is a specification.

This invention relates to machines for manufacturing articles formed from a plurality of narrow strips of fabric or fibrous material set on end and united by intermediate layers of rubber or similar material, the finished product entering into shoe soles or similar articles and being so constructed as to present the ends of the fibers to the ground whereby the life of the soles is lengthened.

This machine is for the purpose of constructing a strip or length of material composed of short strips of the fibrous material set on end and firmly compacted and stuck together by intermediate layers of rubber or other adhesive material. From this length of material the shoe soles are cut out of the proper shape. The machine is designed to carry out the process described and claimed in my co-pending application, Serial No. 279,025, filed February 24, 1919.

While the invention is described as applied to the manufacture of this article, particularly, it is not so limited, but is susceptible of varying uses, all of which fall within the scope of this invention.

In the drawings:

Fig. 1 is a longitudinal section through the machine.

Fig. 2 is a front elevation.

Fig. 3 is a plan.

Fig. 4 is an enlarged section through the packing channel.

Fig. 5 is an enlarged detail of the packing bar.

Fig. 6 is a perspective of the finished product.

As set forth above, the apparatus is designed to construct an article composed of a plurality of strips of fabric or fibrous material set on edge and united by layers of rubber or other adhesive. The fabric layers are designated by the numeral 1 in Fig. 6 and are preferably formed from a layer or layers of rubber coated fabric 2, which are fed into the machine, and cut into strips of the proper width which strips are moved by the cutting blade at an angle to the original plane of the layer and are packed into a confined channel so that they adhere to form the length of right angularly arranged fabric strips 3 which issue from the machine as shown in Fig. 4 and from which the shoe soles are cut.

The machine comprises a bed 4 supported upon uprights or standards 5, the upper surface of the bed supporting a plurality of flanged rollers 6, which support and guide the fabric layer 2. At the forward feeding end of the bed the rollers are formed with grooves 6ª, in which are received rods 6ᵇ, which prevent the cloth from sagging between the rolls. Superposed over the rollers is a plurality of pressure rollers 7, two of which may be formed with guiding flanges in which case the guiding flanges on the rollers 6 below them are omitted.

On the base of the machine is mounted a motor 8, the pinion of which is arranged to drive a gear 10 rotatably mounted on a main drive shaft 11 and arranged to be connected therewith by a clutch 12. The clutch is thrown by a rod 13 connected to an operating lever 14 pivoted to the frame at 15. The shaft 11 carries at its far end a pinion 16 which meshes with a gear 17 of a cam shaft 18.

At one side of the machine the shaft 18 has secured to it a cam 19 on which rides a roller 20 rotatably mounted in the end of a rocking lever 21 which is centrally pivoted to a bracket 22, and held against the cam by a spring 22ª.

The other end of the lever 21 has mounted therein an adjustable pin 23, which is connected to a link 24, the adjustment being for the purpose of adjusting the feed, as will be understood. The upper end of link 24 is connected to a pawl carrying arm 25 carrying a pawl to ride over ratchet wheel 26. The stub shaft 27 of the ratchet wheel has secured to it a gear 28 meshing with gear 29 on a shaft 30 mounted in brackets on the bed plate of the machine and extending along the rollers 6 and 7 carries at its forward end a worm 31 which meshes with worm gears on the ends of the shafts of the forward feed rolls 6.

By the mechanism just described, is provided an even and regular feed for the fabric which may be adjusted to cut strips of varying thickness, according to the depth desired in the finished article.

In the forward end of the bed is secured a cutting block 32, the upper edge of which is sharpened, being held by bolts 33 and vertically adjusted by set screws 34 threaded in lugs 35 extending outwardly from the base of the machine.

Across the front of the machine is a block 36, and extending upwardly from the frame of the machine is a pair of uprights 37, the opposing faces of which are provided with grooves 38, the front walls whereof are slightly tapered. The ends of the block 36 are received in the grooves, there being interposed between the end faces and the walls of the groove a pair of oppositely pointed tapered shims 39 and 40 adjusted in position by bolts 41 and 42 respectively, threaded into the uprights 37. The block is held in its proper position of adjustment by bolts 43 and it is adjusted toward and away from the cutting bar 32 by the shim to provide for wider or narrower cuts.

In the groove 38 between the shims is a reciprocating knife head 44, the lower side of which carries an adjustable knife blade 45 which is of the full width of the channel between the face of the block 36 and the bar 32. When it is desired to change the width of cut, the knife is changed accordingly. The knife head is reciprocated by an eccentric 46 in the shaft 18 operating through eccentric straps 47 and links 48. The knife 45 is adjustably held by set screws 49 and is preferably reversible, so that both edges may be used for cutting, and is provided with tongues 50 at both ends, which tongues always lie in the channel or throat between the block 36 and the cutter bar 32.

Between the rear face of the block 36 and the cutter bar 32 there is provided a throat or channel 51 in which the severed strips of fabric are packed by the knife, the throat gradually flaring out at its lower end to permit the passage of the material 3. On the upper side of the block 36 is adjustably secured a plate 52 which acts as a stop or gauge for the advancing edge of the material.

Beneath the plate is located, across the length of the throat of the machine, a pressure or packer bar 53, which is shown in detail in Fig. 5. On the upper edge of the packer bar is arranged a curved nose or shoulder 54. The function of this shoulder is to straighten up the severed strips as they pass down into the throat of the machine and it prevents them from overturning, causing them all to lie flat and pack nicely in the throat of the machine. The packer bar is slidably mounted in a recess in the block 36 and is pressed toward the cutter bar by springs 55. To the packer bar is secured, by screws 56, bolts 57 having adjustable heads 58 whereby inward movement of the bar is prevented and is allowed to give slightly as the strips of material pass downwardly through the packing throat of the machine.

A brief description of the operation of the machine will be sufficient at this point to render clear a complete understanding of the machine.

The fabric, which is preferably heavily coated with raw or unvulcanized rubber, so that its surface is sticky, is placed on the rollers 6 and under the rollers 7. It is fed forward in equi-spaced amounts or steps by the ratchet mechanism, controlled by the cam 19, the end of the fabric being arrested by the plate 52. As the knife descends it cuts off a strip of the material and forces it down into the throat or channel against the last piece cut off and held therein, whereby the coating sticks them together in a continuous length. The natural tendency of the strips is to turn or tilt as they are cut and to counteract this tendency there is provided the shoulder 54 projecting from the packing bar 53, which causes the strips to right themselves and be packed at right angles. The resilient mounting of the packing bar assists in this action.

When it is desired to change the width of cut, the shims 39 and 40 are adjusted and the knife is changed it being essential that the knife be of the same width as the channel to pack the strips. It will thus be seen that the knife performs two functions, that of cutting the strips and of packing them at right angles to the cut. These two functions may be performed by a single stroke of the knife or they may be separated and performed by two separate parts, if desired.

Other changes and modifications may be made in specific embodiments of the invention, which fall within the scope thereof. Such changes as are fairly within the purview of the appended claims are intended to be covered herein, and I am not limited to the exact form or arrangement of parts as shown.

I claim:

1. In a machine of the character set forth, two spaced walls forming a channel, a reciprocating knife of thickness equal to the width of the channel, movable into and out of the channel, means for feeding fabric into the path of the knife and a projecting shoulder within the channel, said shoulder being mounted for movement relative to said walls.

2. In a machine of the class described, a knife to cut strips of adhesive material, a channel in which said knife moves, and means projecting into the channel to prevent turning of the strips as they pass through the channel.

3. In a machine of the class described, a channel defined by fixed walls, a reciprocating knife for cutting strips from sheet material, a further movement of said knife serving to pack the strips in the channel at right angles to the original sheet, and a yielding shoulder within the channel preventing overturning of the strips.

4. In a machine of the class described, a channel defined by fixed walls, means for cutting strips from sheet material the width of the channel and packing them therein at right angles to the original direction of the sheet, and a packing bar within said channel having a shoulder formed thereon.

5. In a machine for forming sheets of material laminated transversely of the sheet, a confined channel for frictionally holding strips of the material, means for intermittently feeding the sheet in predetermined amounts, and a knife for cutting the strips and forcing them within the channel.

6. In a machine for forming sheets of material laminated transversely of the sheet, a confined channel for frictionally holding strips of the material, a knife for cutting the strips and forcing them within the channel, and means within the channel and movable relative to the walls thereof to prevent the overturning of the strips.

7. In a machine for forming sheets of material laminated transversely of the sheet, a confined channel, the walls whereof frictionally engage strips of the material, a bar inset within one of said walls, a shoulder on said bar projecting within the channel, means acting to yieldingly force said bar toward the center of said channel, and means for packing the strips in the channel.

8. In a machine for forming sheets of material laminated transversely of the sheet, a confined channel, the walls whereof frictionally engage strips of the material, the upper edge of one of said walls being formed with a cutting edge, a knife adapted to co-operate with said edge, and means within the channel to prevent overturning of the strips.

9. In a machine for forming sheets of material laminated transversely of the sheet, a channel, the walls whereof frictionally engage strips of the material, the upper edge of one of said walls being formed with a cutting edge, a knife adapted to co-operate with said edge, a shoulder projecting within said channel on the wall opposite the edge carrying wall.

10. In a machine for forming sheets of material laminated transversely of the sheet, a channel, the walls whereof frictionally engage strips of the material, one of said walls being formed with an upper cutting edge, a knife co-operating with said edge, a bar set within the wall opposite the last mentioned wall, and resilient means for forcing said bar toward the center of the channel.

11. In a machine for forming sheets of material laminated transversely of the sheet, means for feeding an original sheet, a knife for cutting the original sheet into strips, a channel having walls to frictionally engage the edges of the strips, a shoulder projecting from one of said walls within the channel, the action of the knife serving to pack the strips as cut into the channel whereby the laminated fabric is formed.

12. In a machine for forming sheets of material laminated transversely of the sheet, means for feeding an original sheet, a knife for cutting the original sheet into strips, a channel having walls to frictionally engage the edges of the strips, a bar set within one of said walls having a portion extending within said channel, a spring for forcing said bar toward the center of the channel, the action of the knife serving to pack the strips as cut into the channel, whereby the laminated fabric is formed.

13. In a machine for forming sheets of material laminated transversely of the sheet, means for feeding an original sheet, a reciprocating knife for cutting the original sheet into strips, a channel formed by two opposing walls, one of said walls co-operating with the knife to cut the strips, a shoulder projecting from the other of said walls, resilient means for forcing the shoulder toward the center of the channel, the action of the knife serving to pack the strips as cut into the channel, whereby the laminated fabric is formed.

HARVEY F. MARANVILLE.